(12) United States Patent
Mossler

(10) Patent No.: US 12,511,640 B2
(45) Date of Patent: Dec. 30, 2025

(54) SYSTEMS AND METHODS OF MANAGING PASSWORD USING CONTACTLESS CARD

(71) Applicant: Capital One Services, LLC, McLean, VA (US)

(72) Inventor: Lara Mossler, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 12 days.

(21) Appl. No.: 18/120,847

(22) Filed: Mar. 13, 2023

(65) Prior Publication Data

US 2024/0311801 A1  Sep. 19, 2024

(51) Int. Cl.
*G06Q 20/34* (2012.01)
*G06Q 20/40* (2012.01)

(52) U.S. Cl.
CPC ....... *G06Q 20/3572* (2013.01); *G06Q 20/352* (2013.01); *G06Q 20/4018* (2013.01)

(58) Field of Classification Search
None
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

The International Search Report and Written Opinion mailed Jun. 27, 2024, for related PCT/US24/19391 (nine (9) pages).

(Continued)

*Primary Examiner* — Paul S Schwarzenberg
(74) *Attorney, Agent, or Firm* — KDW Firm PLLC; Andrew D. Kasnevich

(57) ABSTRACT

A method includes: receiving, by a server from a user device of a user, a message indicating a forgotten password of an online account of the user; verifying, by the server, at least one contactless card associated with the online account; transmitting, by the server to the user device, a first notification requesting the user to tap the at least one contactless card to the user device; receiving, by the server from the user device, a generated cryptogram, wherein the generated cryptogram is generated by the at least one contactless card; comparing, by the server, the generated cryptogram with a stored cryptogram associated with the at least one contactless card; and in response to a determination that the generated cryptogram matches the stored cryptogram, transmitting, by the server to the user device, a second notification indicating the user is authenticated to perform an action related to the forgotten password.

20 Claims, 8 Drawing Sheets

(56) References Cited

U.S. PATENT DOCUMENTS

| | | |
|---|---|---|
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson et al. |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |

(56) References Cited

U.S. PATENT DOCUMENTS

| | | | |
|---|---|---|---|
| 8,511,547 | B2 | 8/2013 | Rans |
| 8,519,822 | B2 | 8/2013 | Riegebauer |
| 8,559,872 | B2 | 10/2013 | Butler |
| 8,566,916 | B1 | 10/2013 | Vernon et al. |
| 8,567,670 | B2 | 10/2013 | Stanfield et al. |
| 8,572,386 | B2 | 10/2013 | Takekawa et al. |
| 8,577,810 | B1 | 11/2013 | Dalit et al. |
| 8,583,454 | B2 | 11/2013 | Beraja et al. |
| 8,589,335 | B2 | 11/2013 | Smith et al. |
| 8,594,730 | B2 | 11/2013 | Bona et al. |
| 8,615,468 | B2 | 12/2013 | Varadarajan |
| 8,620,218 | B2 | 12/2013 | Awad |
| 8,667,285 | B2 | 3/2014 | Coulier et al. |
| 8,723,941 | B1 | 5/2014 | Shirbabadi et al. |
| 8,726,405 | B1 | 5/2014 | Bailey et al. |
| 8,740,073 | B2 | 6/2014 | Vijayshankar et al. |
| 8,750,514 | B2 | 6/2014 | Gallo et al. |
| 8,752,189 | B2 | 6/2014 | De Jong |
| 8,794,509 | B2 | 8/2014 | Bishop et al. |
| 8,799,668 | B2 | 8/2014 | Cheng |
| 8,806,592 | B2 | 8/2014 | Ganesan |
| 8,807,440 | B1 | 8/2014 | Von Behren et al. |
| 8,811,892 | B2 | 8/2014 | Khan et al. |
| 8,814,039 | B2 | 8/2014 | Bishop et al. |
| 8,814,052 | B2 | 8/2014 | Bona et al. |
| 8,818,867 | B2 | 8/2014 | Baldwin et al. |
| 8,850,538 | B1 | 9/2014 | Vernon et al. |
| 8,861,733 | B2 | 10/2014 | Benteo et al. |
| 8,870,081 | B2 | 10/2014 | Olson |
| 8,880,027 | B1 | 11/2014 | Darringer |
| 8,888,002 | B2 | 11/2014 | Chesney et al. |
| 8,898,088 | B2 | 11/2014 | Springer et al. |
| 8,934,837 | B2 | 1/2015 | Zhu et al. |
| 8,977,569 | B2 | 3/2015 | Rao |
| 8,994,498 | B2 | 3/2015 | Agrafioti et al. |
| 9,004,365 | B2 | 4/2015 | Bona et al. |
| 9,038,893 | B2 | 5/2015 | Kirkham |
| 9,038,894 | B2 | 5/2015 | Khalid |
| 9,042,814 | B2 | 5/2015 | Royston et al. |
| 9,047,531 | B2 | 6/2015 | Showering et al. |
| 9,069,976 | B2 | 6/2015 | Toole et al. |
| 9,081,948 | B2 | 7/2015 | Magne |
| 9,104,853 | B2 | 8/2015 | Venkataramani et al. |
| 9,118,663 | B1 | 8/2015 | Bailey et al. |
| 9,122,964 | B2 | 9/2015 | Krawczewicz |
| 9,129,199 | B2 | 9/2015 | Spodak |
| 9,129,280 | B2 | 9/2015 | Bona et al. |
| 9,152,832 | B2 | 10/2015 | Royston et al. |
| 9,183,490 | B2 | 11/2015 | Moreton |
| 9,203,800 | B2 | 12/2015 | Izu et al. |
| 9,209,867 | B2 | 12/2015 | Royston |
| 9,251,330 | B2 | 2/2016 | Boivie et al. |
| 9,251,518 | B2 | 2/2016 | Levin et al. |
| 9,258,715 | B2 | 2/2016 | Borghei |
| 9,270,337 | B2 | 2/2016 | Zhu et al. |
| 9,275,325 | B2 | 3/2016 | Newcombe |
| 9,286,606 | B2 | 3/2016 | Diamond |
| 9,306,626 | B2 | 4/2016 | Hall et al. |
| 9,306,753 | B1 | 4/2016 | Vandervort |
| 9,306,942 | B1 | 4/2016 | Bailey et al. |
| 9,324,066 | B2 | 4/2016 | Archer et al. |
| 9,324,067 | B2 | 4/2016 | Van Os et al. |
| 9,332,587 | B2 | 5/2016 | Salahshoor |
| 9,338,622 | B2 | 5/2016 | Bjontegard |
| 9,373,141 | B1 | 6/2016 | Shakkarwar |
| 9,379,841 | B2 | 6/2016 | Fine et al. |
| 9,413,430 | B2 | 8/2016 | Royston et al. |
| 9,413,768 | B1 | 8/2016 | Gregg et al. |
| 9,420,496 | B1 | 8/2016 | Indurkar |
| 9,426,132 | B1 | 8/2016 | Alikhani |
| 9,432,339 | B1 | 8/2016 | Bowness |
| 9,455,968 | B1 | 9/2016 | Machani et al. |
| 9,473,509 | B2 | 10/2016 | Arsanjani et al. |
| 9,491,626 | B2 | 11/2016 | Sharma et al. |
| 9,501,776 | B2 | 11/2016 | Martin |
| 9,553,637 | B2 | 1/2017 | Yang et al. |
| 9,619,952 | B1 | 4/2017 | Zhao et al. |
| 9,635,000 | B1 | 4/2017 | Muftic |
| 9,665,858 | B1 | 5/2017 | Kumar |
| 9,674,705 | B2 | 6/2017 | Rose et al. |
| 9,679,286 | B2 | 6/2017 | Colnot et al. |
| 9,680,942 | B2 | 6/2017 | Dimmick |
| 9,710,744 | B2 | 7/2017 | Wurmfeld |
| 9,710,804 | B2 | 7/2017 | Zhou et al. |
| 9,740,342 | B2 | 8/2017 | Paulsen et al. |
| 9,740,988 | B1 | 8/2017 | Levin et al. |
| 9,763,097 | B2 | 9/2017 | Robinson et al. |
| 9,767,329 | B2 | 9/2017 | Forster |
| 9,769,662 | B1 | 9/2017 | Queru |
| 9,773,151 | B2 | 9/2017 | Mil'shtein et al. |
| 9,780,953 | B2 | 10/2017 | Gaddam et al. |
| 9,891,823 | B2 | 2/2018 | Feng et al. |
| 9,892,293 | B1 | 2/2018 | Wade et al. |
| 9,940,571 | B1 | 4/2018 | Herrington |
| 9,949,065 | B1 | 4/2018 | Zarakas |
| 9,953,323 | B2 | 4/2018 | Candelore et al. |
| 9,961,194 | B1 | 5/2018 | Wiechman et al. |
| 9,965,632 | B2 | 5/2018 | Zarakas |
| 9,965,756 | B2 | 5/2018 | Davis et al. |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld et al. |
| 9,990,795 | B2 | 6/2018 | Wurmfeld |
| 10,007,873 | B2 | 6/2018 | Heo |
| 10,013,693 | B2 | 7/2018 | Wyatt |
| 10,043,164 | B2 | 8/2018 | Dogin et al. |
| 10,075,437 | B1 | 9/2018 | Costigan et al. |
| 10,121,130 | B2 | 11/2018 | Pinski et al. |
| 10,129,648 | B1 | 11/2018 | Hernandez et al. |
| 10,133,979 | B1 | 11/2018 | Eidam et al. |
| 10,210,505 | B2 | 2/2019 | Zarakas |
| 10,217,105 | B1 | 2/2019 | Sangi et al. |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B1 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |

(56) References Cited

U.S. PATENT DOCUMENTS

| | | |
|---|---|---|
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 * | 1/2023 | Cook ................ G06Q 20/3226 |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |

(56) References Cited

U.S. PATENT DOCUMENTS

| | | |
|---|---|---|
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |

(56) References Cited

U.S. PATENT DOCUMENTS

| | | | |
|---|---|---|---|
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2019/0392424 A1 | 12/2019 | Wilson et al. |
| 2020/0184482 A1* | 6/2020 | Sharma ............ G06Q 20/3278 |
| 2020/0234295 A1 | 7/2020 | Newman et al. |
| 2020/0376373 A1 | 12/2020 | Amaitis et al. |
| 2021/0004806 A1 | 1/2021 | Noe |
| 2021/0092151 A1* | 3/2021 | Duane ............... H04L 63/0853 |
| 2021/0272098 A1 | 9/2021 | Delsuc |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| KR | 20150140132 A | 12/2015 |
| WO | 9910824 A1 | 3/1999 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved

(56) References Cited

OTHER PUBLICATIONS from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/US/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared-: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
Author Unknown, "Global expansion of card tapping mobile OTP for security and convenience is imminent," Jun. 28, 2022, Retrieved from the Internet: URL: https://www.swidch.com/blogs/card-tapping-motp-blog.
Emvco: "EMV Card Personalisation Specification," Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.

* cited by examiner

SYSTEMS AND METHODS OF MANAGING PASSWORD USING CONTACTLESS CARD

FIELD OF THE INVENTION

The present disclosure relates generally to data security, and more particularly, to systems and methods for managing password using a contactless card as one authentication factor in a multiple factor authentication.

BACKGROUND

Data security and transaction integrity are of critical importance to businesses and consumers. When a customer forgets his/her password for an online account associated with a merchant and desires to reset the password, the merchant may authenticate the customer by asking the customer to provide additional information known to the customer, such as a card verification value (CVV) associated with a credit card stored in the online account.

While the use of a CVV is a common item of additional information used when a customer forgets his/her password, data security and fraud prevention create there is a need for more comparable or even more secure options for customers to retrieve their passwords and/or reset them.

These and other deficiencies exist. Accordingly, there is a need to provide systems and methods that overcome these deficiencies to manage passwords using a more secure factor.

SUMMARY

Aspects of the disclosed technology include systems and methods of password management using a contactless card, such as the use of a contactless card as one authentication factor in a multiple factor authentication.

Embodiments of the present disclosure provide a method for password management using a contactless card. The method comprises: receiving, by a server from a user device of a user, a message indicating a forgotten password of an online account of the user; verifying, by the server, at least one contactless card associated with the online account; transmitting, by the server to the user device, a first notification requesting the user to tap the at least one contactless card to the user device; receiving, by the server from the user device, a generated cryptogram, wherein the generated cryptogram is generated by the at least one contactless card; comparing, by the server, the generated cryptogram with a stored cryptogram associated with the at least one contactless card; and in response to a determination that the generated cryptogram matches the stored cryptogram, transmitting, by the server to the user device, a second notification indicating the user is authenticated to perform an action related to the forgotten password.

Embodiments of the present disclosure provide a system for password management using a contactless card. The system comprises a server. The server can be configured to: receive, from a user device of the user, a message indicating a forgotten password of an online account of the user; verify at least one contactless card is associated with the online account; transmit, to the user device, a first notification requesting the user to tap the at least one contactless card to the user device; receive, from the user device, a generated cryptogram wherein the generated cryptogram is generated by the at least one contactless card; compare the generated cryptogram with a stored cryptogram associated with the at least one contactless card; and in response to a determination that the generated cryptogram matches the stored cryptogram, transmit, to the user device, a second notification indicating the user is authenticated to perform an action related to the forgotten password.

Embodiments of the present disclosure provide a non-transitory, computer-readable medium comprising instructions for password management using a contactless card that, when executed on a computer arrangement, perform actions comprising: receiving, from a user device of the user, a message indicating a forgotten password of an online account of the user; verifying at least one contactless card is associated with the online account; transmitting, to the user device, a first notification requesting the user to tap the at least one contactless card to the user device; receiving, from the user device, a generated cryptogram, wherein the generated cryptogram is generated by the at least one contactless card; comparing the generated cryptogram with a stored cryptogram associated with the at least one contactless card; and in response to a determination that the generated cryptogram matches the stored cryptogram, transmitting, to the user device, a second notification indicating the user is authenticated to perform an action related to the forgotten password.

Further features of the disclosed systems and methods, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
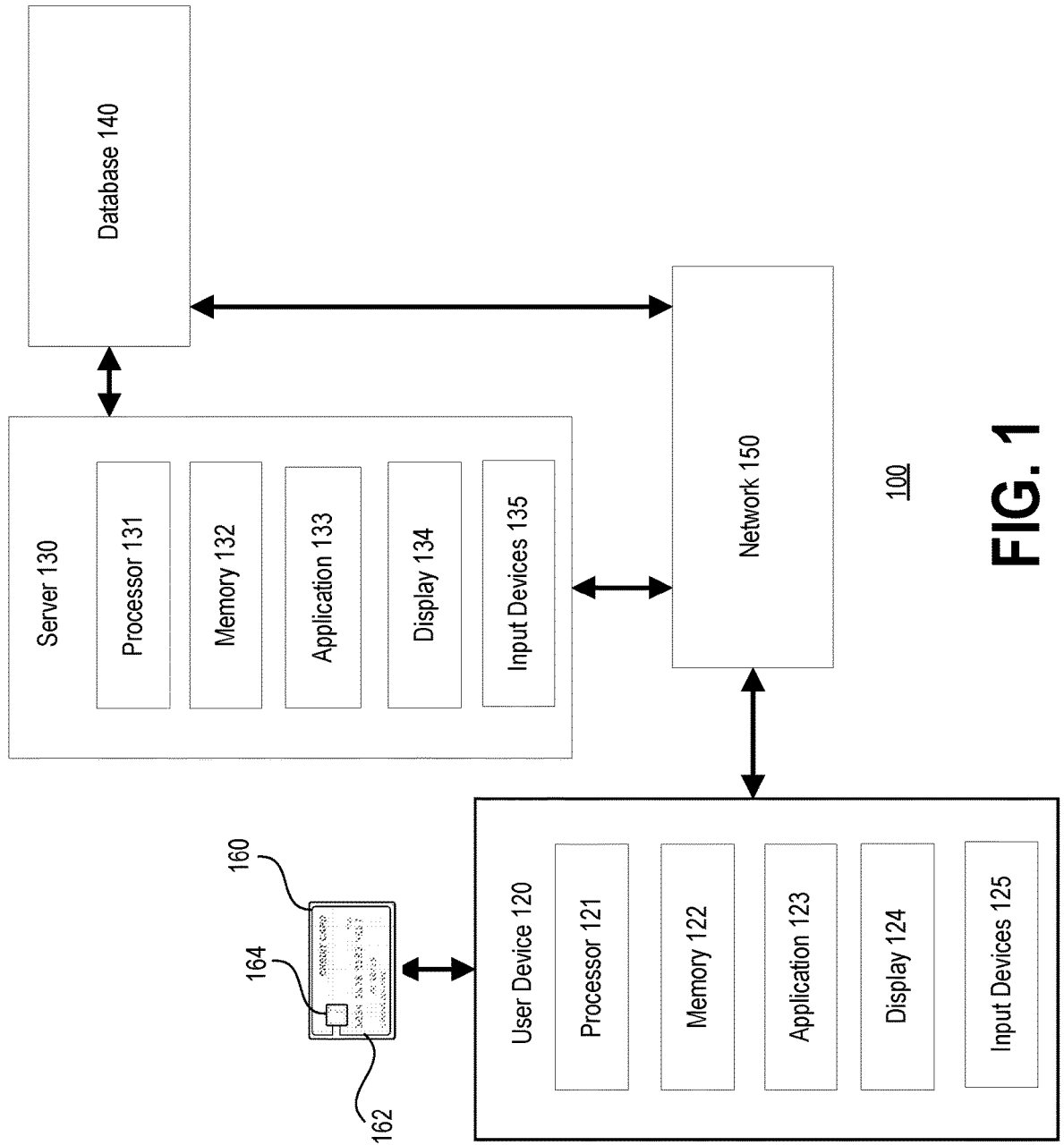
FIG. 1 is a diagram of a system for managing passwords using a contactless card according to an example embodiment.

The following description of embodiments provides non-limiting representative examples referencing numerals to particularly describe features, teachings, and advantages of different aspects of the invention. The embodiments described will be recognized as capable of implementation separately, or in combination, with other embodiments from the description of the embodiments and the features, teachings, and advantages of any embodiment can be interchangeably combined with the features teachings, and advantages of any other embodiment. A person of ordinary skill in the art reviewing the description of embodiments will to learn and understand the different described aspects of the invention. The description of embodiments will facilitate understanding of the invention to such an extent that other implementations, not specifically covered but within the knowledge of a person of skill in the art having read the description of embodiments, will be understood to be consistent with an application of the invention.

Furthermore, the embodiments may be combined in any suitable manner. A person of ordinary skill in the art will recognize that the embodiments may be practiced without one or more of the specific features, teachings, or advantages of an embodiment. In other instances, additional features, teachings, and advantages may be recognized in certain embodiments that may not be present in all embodiments. A person of ordinary skill in the art will understand that the described features, teachings, and advantages of any embodiment can be interchangeably combined with the features, teachings, and advantages of any other embodiment.

Example embodiments of the present disclosure provide systems and methods for authenticating a user using a contactless card as one authentication factor for managing passwords. The present invention allows a user to use information he/she has with a contactless card to complete a high risk authentication transaction (e.g., password management in the present disclosure). As such, the user can retrieve and/or reset his/her forgotten password while having a NFC-enabled device (such as a mobile phone) that can read the contactless card as an authentication factor for authenticating the user.

The present disclosure can be implemented in a system similar to the CVV verification system, and this can be a low cost alternative to CVV that can go across as many lines of businesses that use contactless payment cards. The present invention provides a more secure system and method than using a CVV because contactless card information that is not payment related is less likely to be available or known to others.

Customer experience improvements may include allowing a contactless card to be used with or without another login (e.g., a login into a banking application for reading the contactless card) in connection with on device, such as an Android® instant application, a post authentication session on an iOS® application, a push notification with a long press, and/or tapping the contactless card (e.g., in a drop down action) as part of the same experience. These actions may be within an NFC session, may launch within the banking application context itself, and/or may be launched directly in response to the notification received on the device.

In the present disclosure, a contactless card can be used as an authentication method where a user could be doing the primary action (e.g., a high risk transaction like retrieving and/or resetting passwords) on web, tablet, non-NFC based device, call center, interactive voice response (IVR), Capital One® ENO® virtual assistant, a bank branch, or any other channels used for customer servicing. In some examples, the interaction with the contactless card can be initiated on a NFC-enabled mobile device using communications such as SMS with deeplink, mobile application notifications, push notification, email, or any other channel that can be received on a user device.

FIG. 1 illustrates a system 100 for authenticating a user using a contactless card as an authentication factor for password management according to an example embodiment. As further discussed below, the system 100 may include a user device 120, a server 130, a database 140 in communication using a network 150, and a contactless card 160 in signal communication with the user device 120. Although FIG. 1 illustrates single instances of the components, the system 100 may include any number of components.

The user device 120 can be used by a user to initiate and/or perform transactions with the server 130 for retrieving and/or resetting a password. The user device 120 may be configured to present to the user a user interface from which the user may log into, for example, their bank or credit card account to access their transaction statement and/or financial information stored in the database 140 of the server 130. The user interface may also be configured to perform data communication with the contactless card 160. The user device 120 may be configured to display on the user interface a merchant's website, in response to a selection by the user of accessing the merchant's website.

The user device 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 120 may include a processor 121, a memory 122, an application 123, a display 124, and input devices 125. The processor 121 may be a processor, a microprocessor, or other processor, and the user device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the user device 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as private and personal information.

The application 123 may comprise one or more software applications comprising instructions for execution on the user device 120. In some examples, the user device 120 may execute one or more applications, such as software applications, that enable, for example, network communications with one or more components of the system 100, transmit and/or receive data, and perform the functions and process flows described herein, such as presenting an account login interface to the user of the user device 120 and reading the contactless card 160. Upon execution by the processor 121, the application 123 may provide the functions described in this specification, specifically to execute and perform the steps and functions in the process flows described herein. Such processes may be implemented in software, such as software modules, for execution by computers or other machines. The application 123 may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the user device 120 that is available and supported by the user device 120, such as a touch-screen, keyboard, mouse, cursor-control device, microphone, digital camera, video recorder or camcorder. These devices may be used to enter information and interact with the software and other devices described herein such as selecting an option of creating an online account with the merchant.

The server 130 may be associated with an institution, a merchant, or a service providing entity, such as a financial institution, and can be configured to communicate with the user device 120. The institution associated with the server 130 may issue the contactless card 160 to the user and accordingly may authenticate the user based on the contactless card 160.

The server 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's financial account information and the contactless card information.

The application 133 may comprise one or more software applications, such as a card authentication module, comprising instructions for execution on the server 130. In some examples, the server 130 may execute one or more applications, such as software applications, that enable, for example, network communications with one or more components of the system 100, transmit and/or receive data, and perform the functions and process flows described herein. Upon execution by the processor 131, the application 133 may provide the functions described in this specification, specifically to execute and perform the steps and functions in the process flows described herein. For example, a card authentication module of the application 133 may be executed to perform authenticating the user based on the contactless card 160. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, microphone, digital camera, video recorder or camcorder. These devices may be used to enter information and interact with the software and other devices described herein.

The database 140 may be one or more databases configured to store date, including without limitation, private information of users, financial accounts of users, contactless card information, online merchant account information, transactions of users, and merchant records indicative of corresponding merchants. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 130 or may be hosted externally of the server 130, such as by a server, by a cloud-based platform, or in any storage device that is in data communication with the server 130.

The system 100 may include one or more networks 150. In some examples, the network 150 may be one or more of a wireless network, a wired network or any combination of wireless network and wired network, and may be configured to connect the user device 120, the server 130, and the database 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the server 130, and user device 120 using the network 150 can occur using one or more front channels and one or more secure back channels. A front channel may be a communication protocol that employs a publicly accessible and/or unsecured communication channel such that a communication sent to the server 130, and/or user device 120 may originate from any other device, whether known or unknown to the server 130, and/or user device 120, if that device possesses the address (e.g., network address, Internet Protocol (IP) address) of the server 130, and/or user device 120. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the server 130, and/or user device 120 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

The contactless card 160 may be any type of card, such as a security card, a payment card, an identification card, and the like. The contactless card 160 may be issued to the user by the financial institution for identity verification for the bank account of the user.

The contactless card 160 can be configured to transmit a cryptogram to the user device 120 upon tapping to the user device 120. The user device 120 may be configured to read the cryptogram from the contactless card 160 after entry of the contactless card 160 into a communication field of the user device 120. The user device 120 may then transmit the cryptogram to the server 130. The server 130 may be configured to verify the cryptogram by searching the database 140.

The contactless card 160 can perform authentication and numerous other functions that may otherwise require a user to carry a separate physical token in addition to the contactless card 160. By employing a contactless interface, the contactless card 160 may be provided with a method to interact and communicate between a user's device (such as a mobile phone or the user device 120) and the card itself. For example, the Europay, Mastercard, and Visa (EMV) protocol, which underlies many credit card transactions, includes an authentication process which suffices for operating systems for Android® but presents challenges for iOS®, which is more restrictive regarding near field communication (NFC) usage, as it can be used only in a read-only manner. Exemplary embodiments of the contactless card 160 described herein utilize NFC technology. The contactless card 160 may comprise a substrate 162 and a contact pad 164. Details of an example contactless card will be described in FIGS. 3A and 3B.

Figure 2:
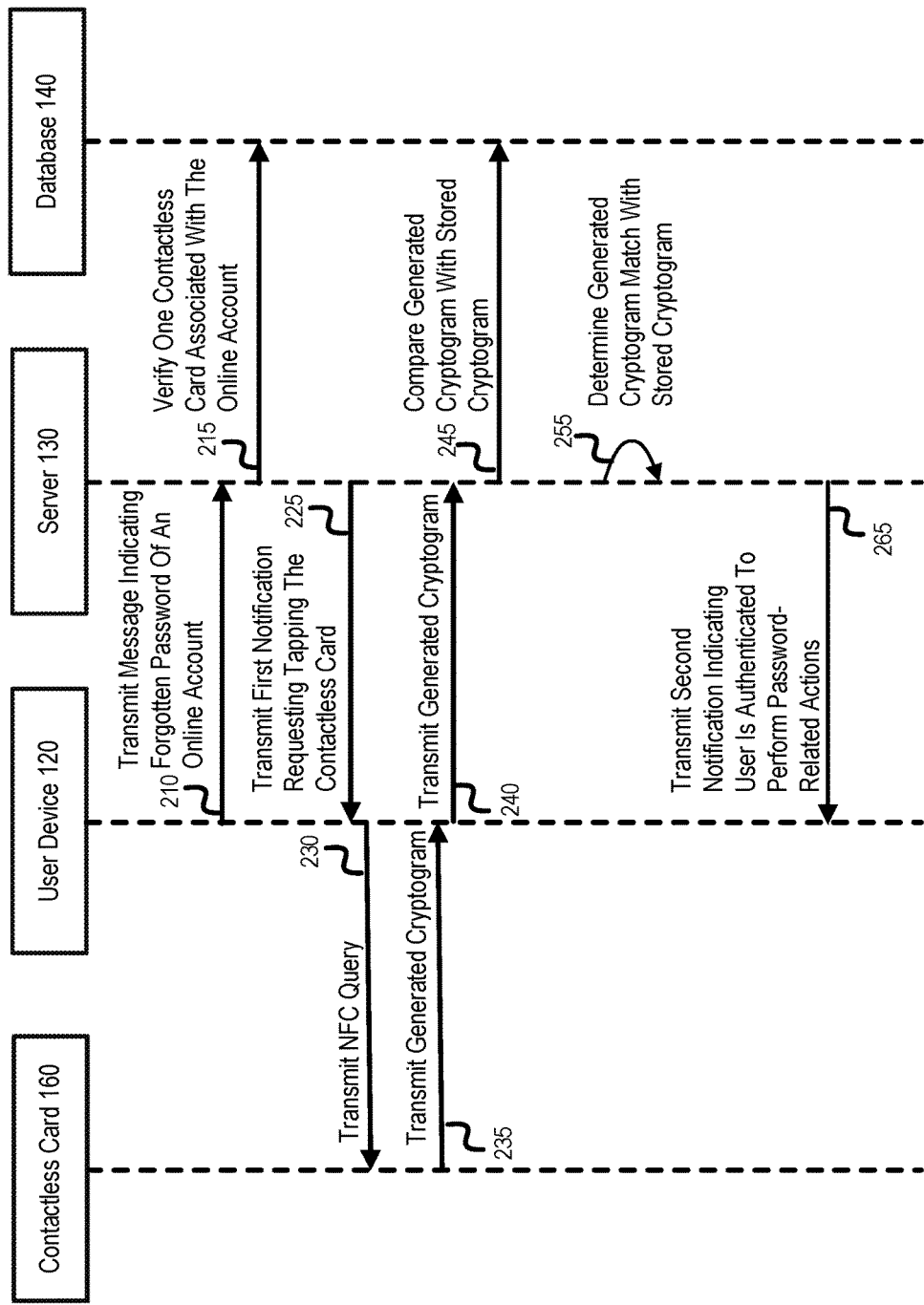
FIG. 2 is a sequence diagram of interactions between components of the system in FIG. 1 according to an example embodiment.

FIG. 2 illustrates an example sequence diagram 200 of interactions between the components of the system 100 according to an example embodiment. FIG. 2 may reference the same or similar components as those illustrated in FIG. 1, including a user device, a server, a database, and a contactless card.

When a user forgets his/her password for an online account, for example, a financial account in a bank, the user may use the user device 120 to transmit to the server 130 a message indicating the user forgets his/her password of an online account at step 210. The server 130 may manage the online account of the user.

Upon receiving the message from the user device 120, at step 215 the server 130 may search, for example using a phone number associated with the user device 120, the database 140 to verify at least one contactless card associated with the online account of the user.

To authenticate the user, at step 225, the server 130 may transmit a first notification to the user device 120 requesting the user to tap the contactless card 160. The first notification may be a short message service (SMS) message with a link that would open up a mobile application or mobile application process on the user device 120 from which the contactless card 160 can be read in that mobile application.

Upon receiving the first notification and by clicking on the link included in the first notification, the user may use the user device 120 to transmit an NFC prompt and/or query to the contactless card 160 at step 230. The user device 120 may include an NFC interface configured for establishing an NFC communication with other NFC-equipped devices (e.g., the contactless card 160 in this embodiment). In some of these embodiments, the NFC interface of the user device 120 may be or include an NFC receiver configured for selectively activating a magnetic field for use in establishing near field communication with an NFC transmitter. The NFC interface of the user device 120 is configured for establishing NFC communication when a passive NFC tag or other NFC-enabled device is brought into the magnetic field and within the NFC communication range of the user device 120. The NFC interface of the user device 120 is configured, in particular, for communication with the NFC-enabled card 160 when the contactless card 160 is brought within communication range of the user device 120 (such as, the contactless card 160 is tapped by the user to the user device 120). As used herein, a tap of the contactless card 160 to the user device 120 may not indicate that the contactless card 160 is in a physical contact with the user device 120. A tap of the contactless card 160 to the user device 120 may refer to entry of the contactless card 160 into the NFC communication field of the user device 120.

In response, after entry of the contactless card 160 into the NFC communication field of the user device 120, the contactless card 160 transmits, at step 235 to the user device 120 NFC response information (e.g., a generated cryptogram) usable by the server 130 to authenticate the user. The NFC response information may be or include, for example, security information encrypted by the contactless card 160 using a private key unique to the card that is known only to the card account administrator (e.g., the server 130). The cryptogram may be stored in the memory of the contactless card 160. The cryptogram includes the unique identifier of the contactless card 160.

At step 240, the user device 120 transmits the NFC response information (the generated cryptogram) the server 130. At step 245, the server 130 receives the generated cryptogram from the user device 120. The server 130 validates the generated cryptogram, decrypts the cryptogram and extracts the unique identifier of the contactless card 160 through the card authentication module of the server 130. When the server 130 receives the cryptogram, the server 130 may decrypt the cryptogram after verifying the cryptogram. The server 130 may then extract the unique identifier of the contactless card 160 which is uniquely associated with the user. At step 245, the server 130 may verify the unique identifier of the contactless card 160 by searching the database 140 to compare the generated cryptogram with a stored cryptogram in the database 140. Then at step 255, the server 130 may authenticate the user based on the unique identifier of the contactless card 160, for example, by determining that the generated cryptogram matches with the stored cryptogram. That is, the server 130 may authenticate the user using the contactless card 160 as the authentication factor based on the unique identifier of the contactless card 160.

In some embodiments, the server 130 may also require the user to enter a personal identification code/number (PIN) as a second authentication factor. Alternatively, the server 130 may require the user to enter a one-time passcode (OTP) as a third authentication factor that is randomly generated and transmitted by the server 130 to the user device 120 in a text message.

At step 265, the server 130 may transmit to the user device 120 a second notification indicating that the authentication result of using the contactless card 160 as the authentication factor is determined, that is, the user is authenticated to perform password-related actions. Once the user is authenticated using the contactless card 160 as the authentication factor, the user can perform the password-related actions through the user device 120. Herein, the password-related actions may include, but not limited to, resetting the password, changing the password, retrieving the password, and so forth.

The second notification may comprise a clickable link from which the user is able to reset, change, or retrieve the password of the online account. The second notification may be transmitted through an application programming interface (API) of the server 130. The second notification may comprise at least one selected from the group of a short message service (SMS) message with a deeplink, a mobile application notification, a push notification, or an email. The password-related actions may also include at least one selected from the group of using a temporary password to log into the online account and resetting the password of the online account.

As described above, when a user uses a user device to initiate an event or transaction with the server for password management, the user can be directed to use a mobile application installed on the user device to read a contactless card for authenticating the user as an authentication factor.

Figure 3A:
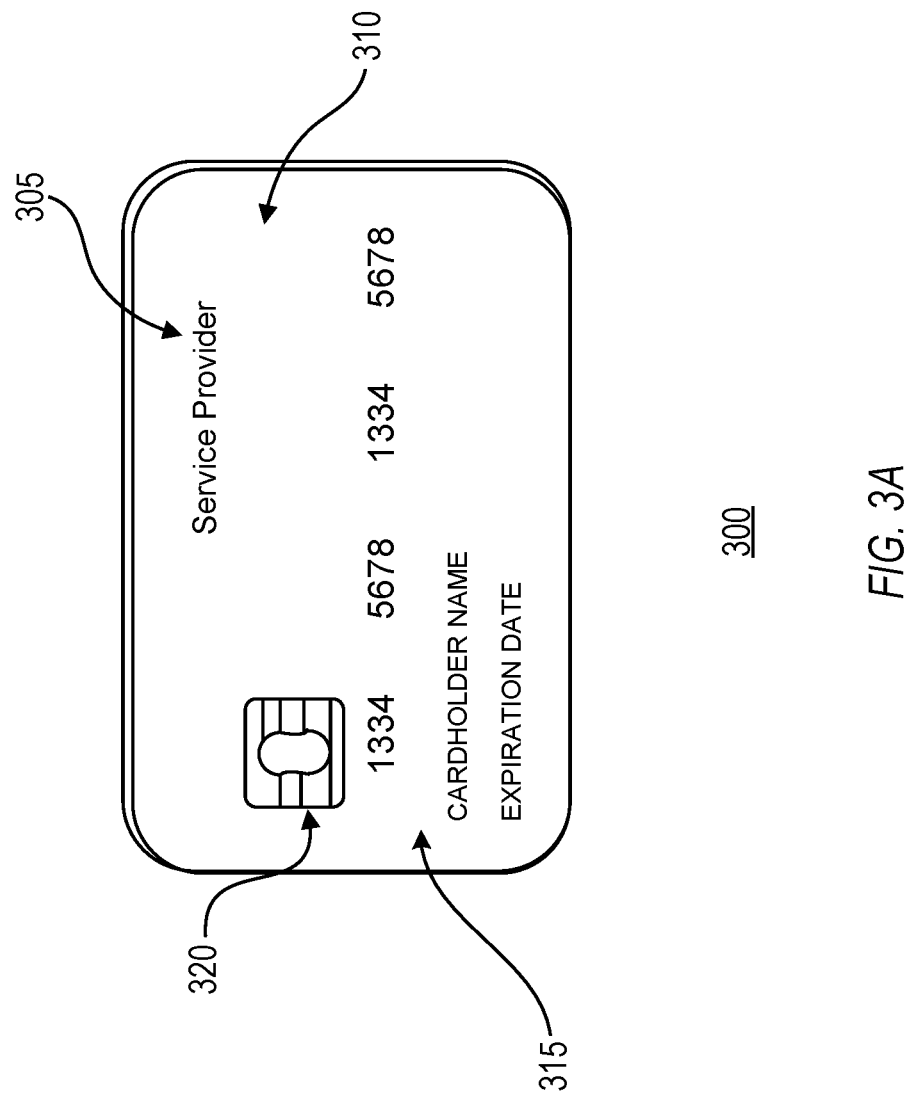
FIG. 3A is a contactless card used for managing passwords according to an example embodiment.

FIG. 3A describes a contactless card 300 that can be used for authenticating the user as an authentication factor in the system 100 of FIG. 1. The contactless card 160 in FIG. 1 can be the contactless card 300 described herein. The contactless card 300 is configured to communicate with the user device 120 of system 100. The contactless card 300 may comprise a payment card, such as a credit card, debit card, or gift card, issued by a service provider 305 (such as a bank associated with the server 130) displayed on the front or back of the contactless card 300. In some examples, the contactless card 300 is not related to a payment card, and may comprise, without limitation, an identification card, a membership card, and a transportation card. In some examples, the contactless card 300 may comprise a dual interface contactless payment card.

The contactless card 300 may comprise a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card 300 may otherwise be compliant with the ISO/IEC 14443 standard. However, it is understood that the contactless card 300 according to the present disclosure may have different characteristics, and the present disclosure does not require the contactless card 300 to be implemented in a payment card.

The contactless card 300 may also include identification information 315 displayed on the front and/or back of the contactless card 300, and a contact pad 320. The contact pad 320 may be configured to establish contact with another communication device, such as a user device, smart phone, laptop, desktop, or tablet computer. The contactless card 300 may also include processing circuitry, antenna and other components. These components may be located behind the contact pad 320 or elsewhere on the substrate. The contactless card 300 may also include a magnetic strip or tape, which may be located on the back of the contactless card 300.

Figure 3B:
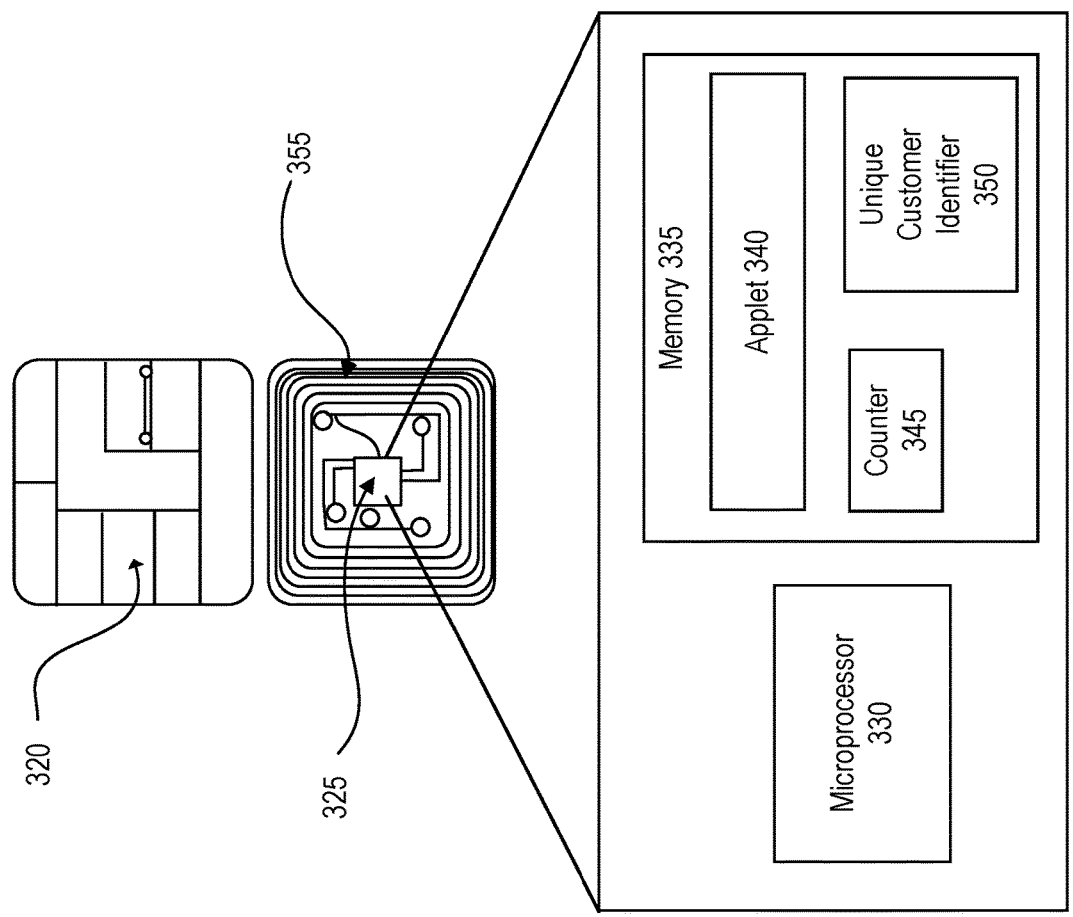
FIG. 3B is a diagram of the processor of the contactless card in FIG. 3A according to an example embodiment.

FIG. 3B illustrates an example contact pad 320 of the contactless card 300. The contact pad 320 of the contactless card 300 may include processing circuitry 325 for storing and processing information, including a processor 330 and a memory 335. It is understood that the processing circuitry 325 may contain additional components, including processors, memories, error and parity/CRC checkers, data encoders, anticollision algorithms, controllers, command decoders, security primitives and tamperproofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

In some embodiments, the memory 335 may also have stored public and private card encryption keys. In some embodiments, the private and public encryption keys may be permanently hard-wired into the memory 335. In various embodiments, the memory 335 may have stored therein instructions for generating encrypted information and transmitting it to a receiving device (e.g., the user device 120). Such encrypted information may be or include an encrypted verification block or signature that may be used to authenticate and verify the presence of the card 300 during transaction processing. In some embodiments, encrypted information may be unique to a particular communication (e.g., a particular NFC transmission by the card 300).

The memory 335 may be configured to store one or more applets 340, one or more counters 345, and a unique customer identifier 350. The one or more applets 340 may comprise one or more software applications configured to execute on one or more contactless cards, such as Java Card applet, and perform the functions and process flows described herein. However, it is understood that the one or more applets 340 are not limited to Java Card applets, and instead may be any software application operable on contactless cards or other devices having limited memory. The one or more counters 345 may comprise a numeric counter sufficient to store an integer. The unique customer identifier 350 may comprise a unique alphanumeric identifier assigned to a user of the contactless card 300, and the identifier may distinguish the user of the contactless card 300 from other contactless card users. In some examples, the customer identifier 350 may identify both a customer and an account assigned to that customer and may further identify the contactless card 300 associated with the customer's account.

The processor 330 and memory 335 elements of the foregoing exemplary embodiments are described with reference to the contact pad 320, but the present disclosure is not limited thereto. It is understood that these elements may be implemented outside of the contact pad 320 or entirely separate from it, or as further elements in addition to the processor 330 and the memory 335 elements located within the contact pad 320.

In some examples, the contactless card 300 may comprise one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. A terminal (such as the user device 120) may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless card 300 may be built on a software platform operable on smart cards or other devices having limited memory, such as JavaCard, and one or more or more applications or applets (applet 340) may be securely executed. Applets may be added to contactless cards to provide a one-time password (OTP) for multiple factor authentication (MFA) in various mobile application-based use cases. Applets may be configured to respond to one or more requests, such as near field data exchange requests, from a reader, such as a mobile NFC reader (the user device 120), and produce an NDEF message that comprises a cryptographically secure OTP encoded as an NDEF text tag.

The contactless card 300 may be configured for communication with the user device 120 via a communication interface configured for establishing communication with the user device 120. The communication interface may be configured for contact-based communication, in which case the interface may have electrical circuitry and contact pads on the surface of the card 300 for establishing direct electrical communication between the card 300 and the user device 120. Alternatively or in addition, the communication interface may be configured for contactless communication with the user device 120. In such embodiments, the communication interface may be or include an NFC communication interface configured for communication with other NFC communication devices when the card 300 is within a predetermined NFC range. In some embodiments, the card 300 may include a second communication interface configured for establishing short range communication with the user device 120 via Bluetooth, or other short range communication methodology. In such embodiments, the card 300 may have a short range communication antenna that is included in or connected to the short range communication interface. The card 300 may also include a power management system for use in managing the distribution of power during an NFC transaction.

The contactless card 300 can be configured to transmit a cryptogram to the user device 120 upon tapping to the user device 120. The user device 120 may be configured to read the cryptogram from the contactless card 300 after entry of the contactless card 300 into a communication field of the user device 120. The user device 120 may then transmit the cryptogram to the server 130. The server 130 may be configured to verify the cryptogram by searching the database 140.

In some embodiments, the cryptogram can be generated by the contactless card 300 as follows. When receiving a request for authentication, the counter 345 can increment counter. The applet 340 upon execution by the processor 330 can generate two session keys (e.g., one for encryption (ENC) and one for message authentication code (MAC)) using secret keys combined with the counter. The applet 340 can generate a MAC with the MAC session key over the counter, the unique customer identifier (pUID) 350, shared secret, and/or an applet version number of the applet 340. The applet 340 can encrypt the MAC with the ENC session key to generate a cryptogram. The applet 340 can transmit the applet version number, pUID, counter and encrypted MAC (the cryptogram) to the user device 120. It is understood that comparable operations can be performed upon receipt of the cryptogram.

Figure 4:
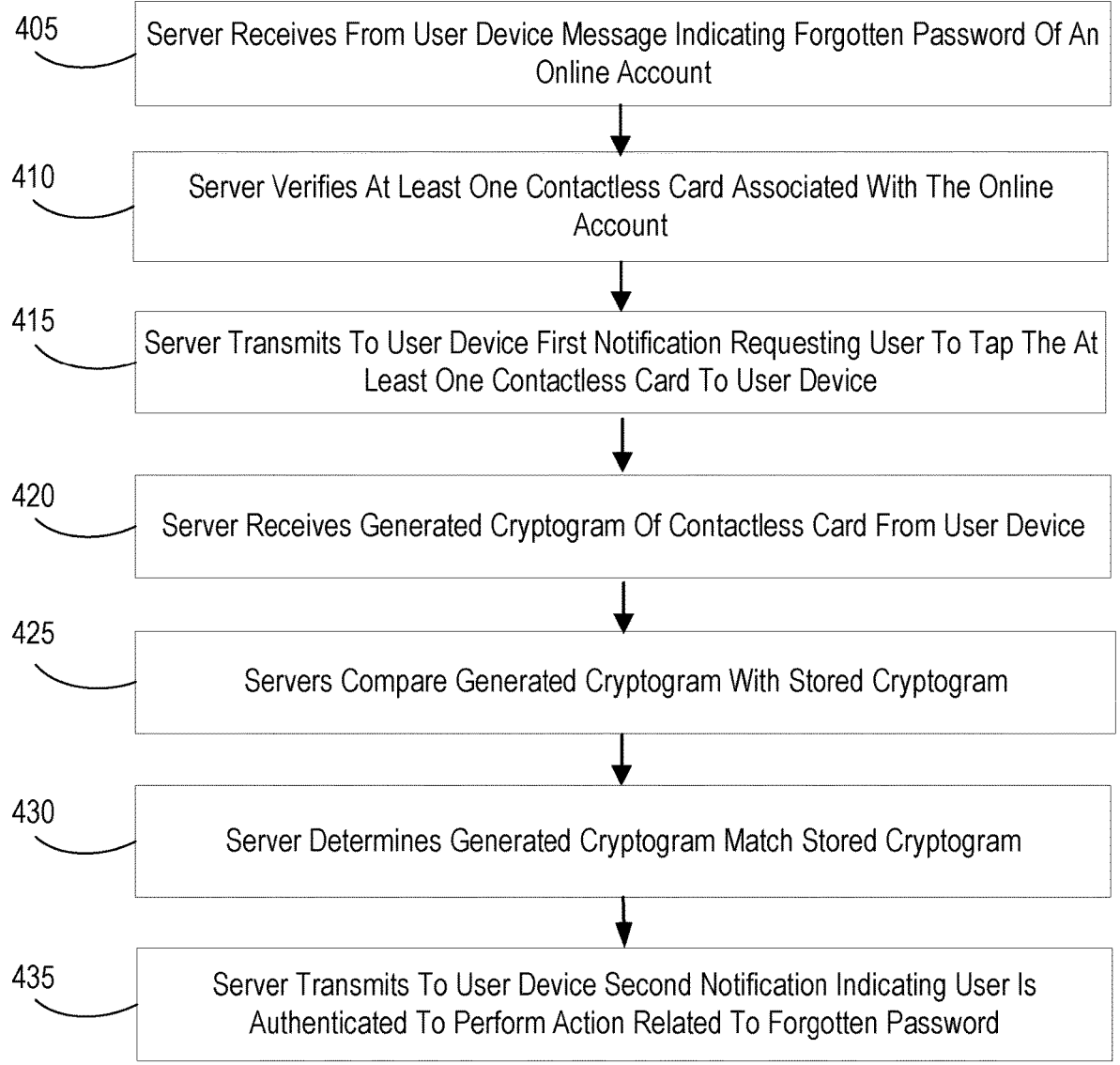
FIG. 4 is a flow chart of a method for managing passwords using a contactless card according to an example embodiment.

FIG. 4 illustrates a flow chart of an example method 400 for managing passwords using a contactless card as an authentication factor according to an example embodiment. FIG. 4 may reference the same or similar components as those illustrated in FIGS. 1-3, including a user device, a server, a database, and a contactless card. The method 400 can be implemented in the system 100 and may include, but is not limited to the following steps.

When a user forgets his/her password for an online account, for example, a financial account in a bank, the user may use a user device (e.g., the user device 120) to transmit to a server (e.g., the server 130) a message indicating the user forgets his/her password of the online account. The server may be associated with the bank and is configured to manage the online account of the user. Accordingly, at step 405, the server can receive from the user device the message indicating the user forgets his/her password of the online account.

Upon receiving the message from the user device, at step 410 the server may search, for example using a phone number associated with the user device, a database (e.g., the database 140) to verify that at least one contactless card (e.g., the contactless card 160/300) is associated with the online account of the user.

To authenticate the user, at step 415, the server may transmit a first notification to the user device requesting the user to tap the at least one contactless card. The first notification can be a short message service (SMS) message with a link that would open up a mobile application or mobile application process on the user device from which the contactless card can be read in that mobile application.

Upon receiving the first notification and by clicking on the link included in the first notification, the user may use the user device to transmit an NFC prompt/query to the contactless card. The user device may include an NFC interface configured for establishing an NFC communication with other NFC-equipped devices (e.g., the contactless card 160/300 in this embodiment). In some of these embodiments, the NFC interface of the user device may be or include an NFC receiver configured for selectively activating a magnetic field for use in establishing near field communication with an NFC transmitter. The NFC interface of the user device is configured for establishing NFC communication when a passive NFC tag or other NFC-enabled device is brought into the magnetic field and within the NFC communication range of the user device. The NFC interface of the user device is configured, in particular, for communication with the NFC-enabled card when the contactless card is brought within communication range of the user device (such as, the contactless card 160/300 is tapped by the user to the user device 120). As used herein, a tap of the contactless card to the user device may not indicate that the contactless card is in a physical contact with the user device. A tap of the contactless card to the user device may refer to entry of the contactless card into the NFC communication field of the user device.

In response, after entry of the contactless card into the NFC communication field of the user device, the contactless card transmits to the user device NFC response information (e.g., a generated cryptogram) usable by the server to authenticate the user. The NFC response information may be or include, for example, security information encrypted by the contactless card using a private key unique to the card that is known only to the card account administrator (e.g., the server 130). The cryptogram may be stored in the memory of the contactless card. The cryptogram includes the unique identifier of the contactless card.

The user device transmits the NFC response information (the generated cryptogram) to the server. At step 420, the server receives the generated cryptogram of the contactless card from the user device. At step 425, the server may compare the generated cryptogram with a stored cryptogram that is stored in a database (e.g., the database 140). The stored cryptogram can be generated by the server as follows: the server generates card two UDK keys (one for encryption and one for authentication) using the pUID and two bin level master keys (one for encryption and one for authentication), the server generates two session keys (one for encryption and one for authentication) from the two UDK keys and the counter, and the server generates the stored cryptogram using the authentication session key.

At step 430, the server determines that the generated cryptogram matches the stored cryptogram. For example, the server decrypts the MAC message from the generated cryptogram using the encryption session key and validate the MAC over the same info (e.g., pUID, counter, shared secret) using the authentication (MAC) session key. Alternatively, the server may validate the generated cryptogram by decrypting the generated cryptogram and extracting the unique identifier of the contactless card through the card authentication module of the server. When the server receives the generated cryptogram, the server may decrypt the generated cryptogram after verifying the generated cryptogram. The server may then extract the unique identifier of the contactless card which is uniquely associated with the user. The server may verify the unique identifier of the contactless card by searching the database to compare the generated cryptogram with the stored cryptogram in the database. Then the server may authenticate the user based on the unique identifier of the contactless card, for example, by determining that the generated cryptogram matches with the stored cryptogram. That is, the server may authenticate the user using the contactless card as the authentication factor based on the unique identifier of the contactless card.

In some embodiments, the server may also require the user to enter a personal identification code/number (PIN) as a second authentication factor. Alternatively, the server may require the user to enter a one-time passcode (OTP) as a third authentication factor that is randomly generated and transmitted by the server to the user device in a text message.

At step 435, the server can transmit to the user device a second notification indicating that the authentication result of using the contactless card as the authentication factor is determined, that is, the user is authenticated to perform actions related to forgotten password. Once the user is authenticated by the server using the contactless card as the authentication factor, the user can perform the password-related actions through the user device. Herein, the password-related actions may include, but not limited to, resetting the password, changing the password, retrieving the password, receiving a temporary password from the server, using the temporary password for logging into the online account, and so forth.

The second notification may comprise a clickable link from which the user is able to reset, change, or retrieve the password of the online account. The second notification may be transmitted through an application programming interface (API) of the server. The second notification may comprise at least one selected from the group of a short message service (SMS) message with a deeplink, a mobile application notification, a push notification, or an email. The password-related actions may also include at least one selected from the group of using a temporary password to log into the online account and resetting the password of the online account.

Figure 5:
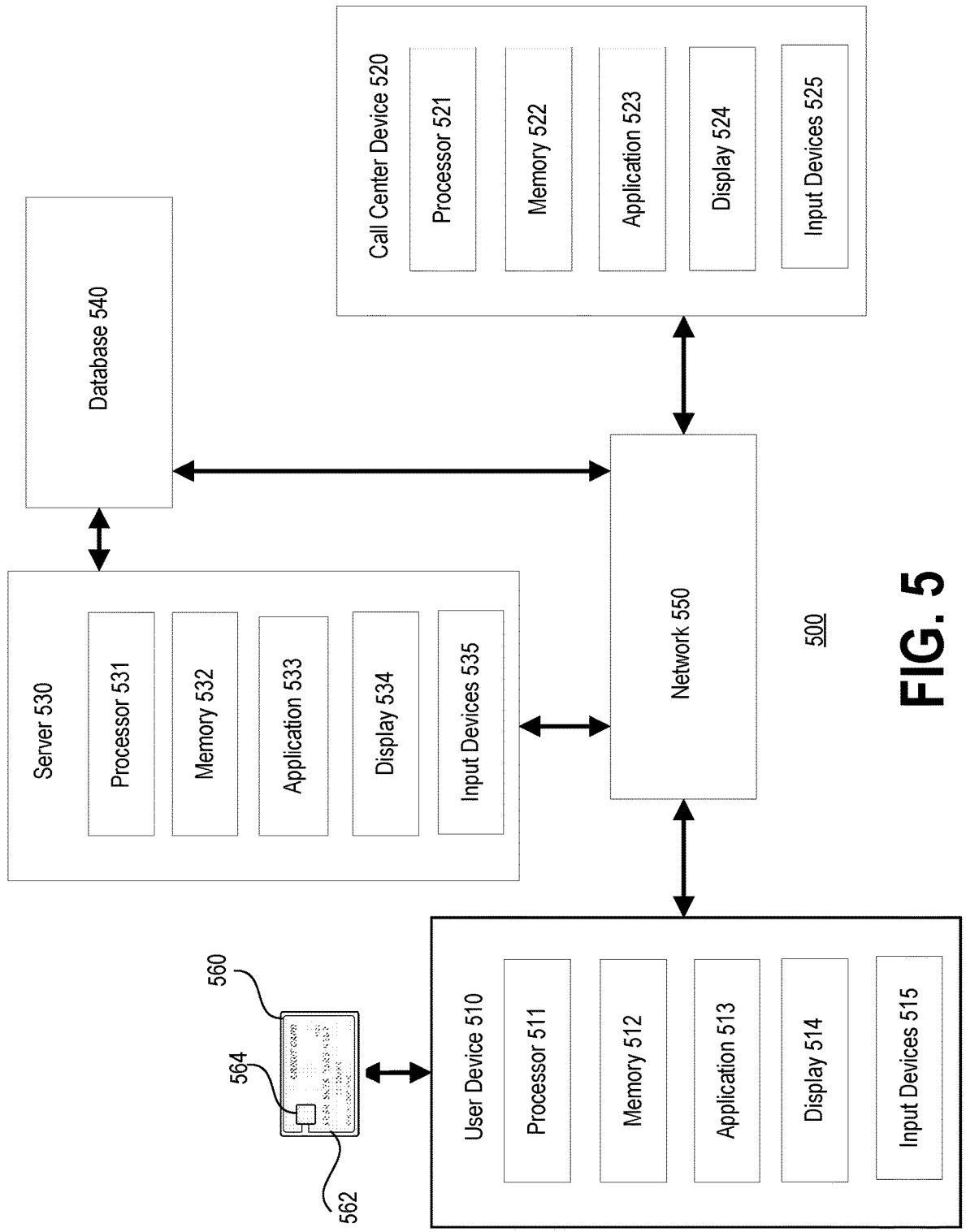
FIG. 5 is a diagram of another system for managing passwords using a contactless card according to an example embodiment.

FIG. 5 illustrates a system 500 for authenticating a user using a contactless card as an authentication factor for password management according to an example embodiment. As further discussed below, the system 500 may include a user device 510, a call center device 520, a server 530, a database 540 in communication using a network 550, and a contactless card 560 in signal communication with the user device 510. Although FIG. 5 illustrates single instances of the components, the system 500 may include any number of components.

The user device 510 can be used by a user to initiate and/or perform transactions with the call center device 520, for example, a call to a customer service center associated with the call center device 520. The user device 510 may be configured to present to the user a user interface from which the user may log into, for example, their bank or credit card account to access their transaction statement and/or financial information stored in the database 540 of the server 530. The user interface may also be configured to perform data communication with the contactless card 560. The user device 510 may be configured to display on the user interface a merchant's website, in response to a selection by the user of accessing the merchant's website.

The user device 510 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 510 may include a processor 511, a memory 512, an application 513, a display 514, and input devices 515. The processor 511 may be a processor, a microprocessor, or other processor, and the user device 510 may include one or more of these processors. The processor 511 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 511 may be coupled to the memory 512. The memory 512 may be a read-only memory, write-once read-multiple memory or read/write memory, e.g., RAM, ROM, and EEPROM, and the user device 510 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 512 may be configured to store one or more software applications, such as the application 513, and other data, such as private and personal information.

The application 513 may comprise one or more software applications comprising instructions for execution on the user device 510. In some examples, the user device 510 may execute one or more applications, such as software applications, that enable, for example, network communications with one or more components of the system 500, transmit and/or receive data, and perform the functions and process flows described herein such as presenting the online website to the user of the user device 510 and reading the contactless card 560. Upon execution by the processor 511, the application 513 may provide the functions described in this specification, specifically to execute and perform the steps and functions in the process flows described below. Such processes may be implemented in software, such as software modules, for execution by computers or other machines. The application 513 may provide graphic user interfaces (GUIs) through which users may view and interact with other components and devices within the system 500. The GUIs may be formatted, for example, as web pages in HyperText Markup Language (HTML), Extensible Markup Language (XML) or in any other suitable form for presentation on a display device depending upon applications used by users to interact with the system 500.

The user device 510 may further include a display 514 and input devices 515. The display 514 may be any type of device for presenting visual information such as a computer monitor, a flat panel display, and a mobile device screen, including liquid crystal displays, light-emitting diode displays, plasma panels, and cathode ray tube displays. The input devices 515 may include any device for entering information into the user device 510 that is available and supported by the user device 510, such as a touch-screen, keyboard, mouse, cursor-control device, microphone, digital camera, video recorder or camcorder. These devices may be used to enter information and interact with the software and other devices described herein such as selecting an option of creating an online account with the merchant.

The call center device 520 may be associated with the merchant or the bank with which the transactions are conducted by the user through the user device 510, for example, password management or online purchases made from the merchant. The call center device 520 may also be associated with a call/service center to which the user may make a call to initiate a transaction such as discussing product/service issues. The call center device 520 may further be associated with a bank branch in which the user may conduct an transaction and interact with a bank employee. If the call center device 520 is associated with a merchant, the call center device 520 can be configured to store the online merchant accounts, and to present a shopping interface and/or a login interface on which the user can conduct the transactions with the merchant or log into an online account of the user.

The call center device 520 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The call center device 520 may include a processor 521, a memory 522, and an application 523. The processor 521 may be a processor, a microprocessor, or other processor, and the call center device 520 may include one or more of these processors. The processor 521 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 521 may be coupled to the memory 522. The memory 522 may be a read-only memory, write-once read-multiple memory or read/write memory, e.g., RAM, ROM, and EEPROM, and the call center device 520 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 522 may be configured to store one or more software applications, such as the application 523, and other data, such as user's shopping and financial account information.

The application 523 may comprise one or more software applications comprising instructions for execution on the call center device 520. In some examples, the call center device 520 may execute one or more applications, such as software applications, that enable, for example, network communications with one or more components of the system 500, transmit and/or receive data, and perform the functions and process flows described herein. Upon execution by the processor 521, the application 523 may provide the functions described in this specification, specifically to execute and perform the steps and functions in the process flows described below. For example, the application 523 may be executed to perform authenticating the user or send an authentication request of authenticating the user to the server 530. The application 523 may also be executed to perform processing transactions of a user who may shop online from the merchant or access online bank account of a bank. Such processes may be implemented in software, such as software modules, for execution by computers or other machines. The application 523 may provide GUIs through which a user may view and interact with other components and devices within the system 500. The GUIs may be formatted, for example, as web pages in HyperText Markup Language (HTML), Extensible Markup Language (XML) or in any other suitable form for presentation on a display device depending upon applications used by users to interact with the system 500.

The call center device 520 may further include a display 524 and input devices 525. The display 524 may be any type of device for presenting visual information such as a computer monitor, a flat panel display, and a mobile device screen, including liquid crystal displays, light-emitting diode displays, plasma panels, and cathode ray tube displays. The input devices 525 may include any device for entering information into the call center device 520 that is available and supported by the call center device 520, such as a touch-screen, keyboard, mouse, cursor-control device, microphone, digital camera, video recorder or camcorder. These devices may be used to enter information and interact with the software and other devices described herein.

The server 530 may be associated with an institution, such as a financial institution, and can be configured to communicate with the call center device 520 and the user device 510. The institution associated with the server 530 may issue the contactless card 560 to the user and accordingly may authenticate the user based on the contactless card 560.

The server 530 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 530 may include a processor 531, a memory 532, and an application 533. The processor 531 may be a processor, a microprocessor, or other processor, and the server 530 may include one or more of these processors. The processor 531 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 531 may be coupled to the memory 532. The memory 532 may be a read-only memory, write-once read-multiple memory or read/write memory, e.g., RAM, ROM, and EEPROM, and the server 530 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 532 may be configured to store one or more software applications, such as the application 533, and other data, such as user's financial account information and the contactless card information.

The application 533 may comprise one or more software applications, such as a card authentication module, comprising instructions for execution on the server 530. In some examples, the server 530 may execute one or more applications, such as software applications, that enable, for example, network communications with one or more components of the system 500, transmit and/or receive data, and perform the functions and process flows described herein. Upon execution by the processor 531, the application 533 may provide the functions described in this specification, specifically to execute and perform the steps and functions in the process flows described below. For example, the card authentication module of the application 533 may be executed to perform authenticating the user based on the contactless card 560. Such processes may be implemented in software, such as software modules, for execution by computers or other machines. The application 533 may provide GUIs through which a user may view and interact with other components and devices within the system 500. The GUIs may be formatted, for example, as web pages in HyperText Markup Language (HTML), Extensible Markup Language (XML) or in any other suitable form for presentation on a display device depending upon applications used by users to interact with the system 500.

The server 530 may further include a display 534 and input devices 535. The display 534 may be any type of device for presenting visual information such as a computer monitor, a flat panel display, and a mobile device screen, including liquid crystal displays, light-emitting diode displays, plasma panels, and cathode ray tube displays. The input devices 535 may include any device for entering information into the server 530 that is available and supported by the server 530, such as a touch-screen, keyboard, mouse, cursor-control device, microphone, digital camera, video recorder or camcorder. These devices may be used to enter information and interact with the software and other devices described herein.

The database 540 may be one or more databases configured to store date, including without limitation, private information of users, financial accounts of users, contactless card information, online merchant account information, transactions of users, and merchant records indicative of corresponding merchants. The database 540 may comprise a relational database, a non-relational database, or other database implementations, and any combination thereof, including a plurality of relational databases and non-relational databases. In some examples, the database 540 may comprise a desktop database, a mobile database, or an in-memory database. Further, the database 540 may be hosted internally by the server 530 or may be hosted externally of the server 530, such as by a server, by a cloud-based platform, or in any storage device that is in data communication with the server 530.

The system 500 may include one or more networks 550. In some examples, the network 550 may be one or more of a wireless network, a wired network or any combination of wireless network and wired network, and may be configured to connect the call center device 520, the user device 510, the server 530, and the database 540. For example, the network 550 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.b, 802.55.5, 802.55n and 802.55g, Bluetooth, NFC, Radio Frequency Identification (RFID), Wi-Fi, and/or the like.

In addition, the network 550 may include, without limitation, telephone lines, fiber optics, IEEE Ethernet 902.3, a wide area network, a wireless personal area network, a LAN, or a global network such as the Internet. In addition, the network 550 may support an Internet network, a wireless communication network, a cellular network, or the like, or any combination thereof. The network 550 may further include one network, or any number of the exemplary types of networks mentioned above, operating as a stand-alone network or in cooperation with each other. The network 550 may utilize one or more protocols of one or more network elements to which they are communicatively coupled. The network 550 may translate to or from other protocols to one or more protocols of network devices. Although the network 550 is depicted as a single network, it should be appreciated that according to one or more examples, the network 550 may comprise a plurality of interconnected networks, such as, for example, the Internet, a service provider's network, a cable television network, corporate networks, such as credit card association networks, and home networks. The network 550 may further comprise, or be configured to create, one or more front channels, which may be publicly accessible and through which communications may be observable, and one or more secured back channels, which may not be publicly accessible and through which communications may not be observable.

In some examples, communications between the call center device 520, server 530, and user device 510 using the network 550 can occur using one or more front channels and one or more secure back channels. A front channel may be a communication protocol that employs a publicly accessible and/or unsecured communication channel such that a communication sent to the call center device 520, server 530, and/or user device 510 may originate from any other device, whether known or unknown to the call center device 520, server 530, and/or user device 510, if that device possesses the address (e.g., network address, Internet Protocol (IP) address) of the call center device 520, server 530, and/or user device 510. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the call center device 520, server 530, and/or user device 510 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

The contactless card 560 may be any type of card, such as a security card, a payment card, an identification card, and the like. The contactless card 560 may be issued to the user by the financial institution for identity verification for the bank account of the user.

The contactless card 560 can be configured to transmit a cryptogram to the user device 510 upon tapping to the user device 510. The user device 510 may be configured to read the cryptogram from the contactless card 560 after entry of the contactless card 560 into a communication field of the user device 510. The user device 510 may then transmit the cryptogram to the server 530. The server 530 may be configured to verify the cryptogram by searching the database 540.

The contactless card 560 can perform authentication and numerous other functions that may otherwise require a user to carry a separate physical token in addition to the contactless card 560. By employing a contactless interface, the contactless card 560 may be provided with a method to interact and communicate between a user's device (such as a mobile phone or the user device 510) and the card itself. For example, the Europay, Mastercard, and Visa (EMV) protocol, which underlies many credit card transactions, includes an authentication process which suffices for operating systems for Android® but presents challenges for iOS®, which is more restrictive regarding near field communication (NFC) usage, as it can be used only in a read-only manner. Exemplary embodiments of the contactless card 560 described herein utilize NFC technology. The contactless card 560 may comprise a substrate 562 and a contact pad 564. Details of an example contactless card are described in FIGS. 3A and 3B.

Figure 6:
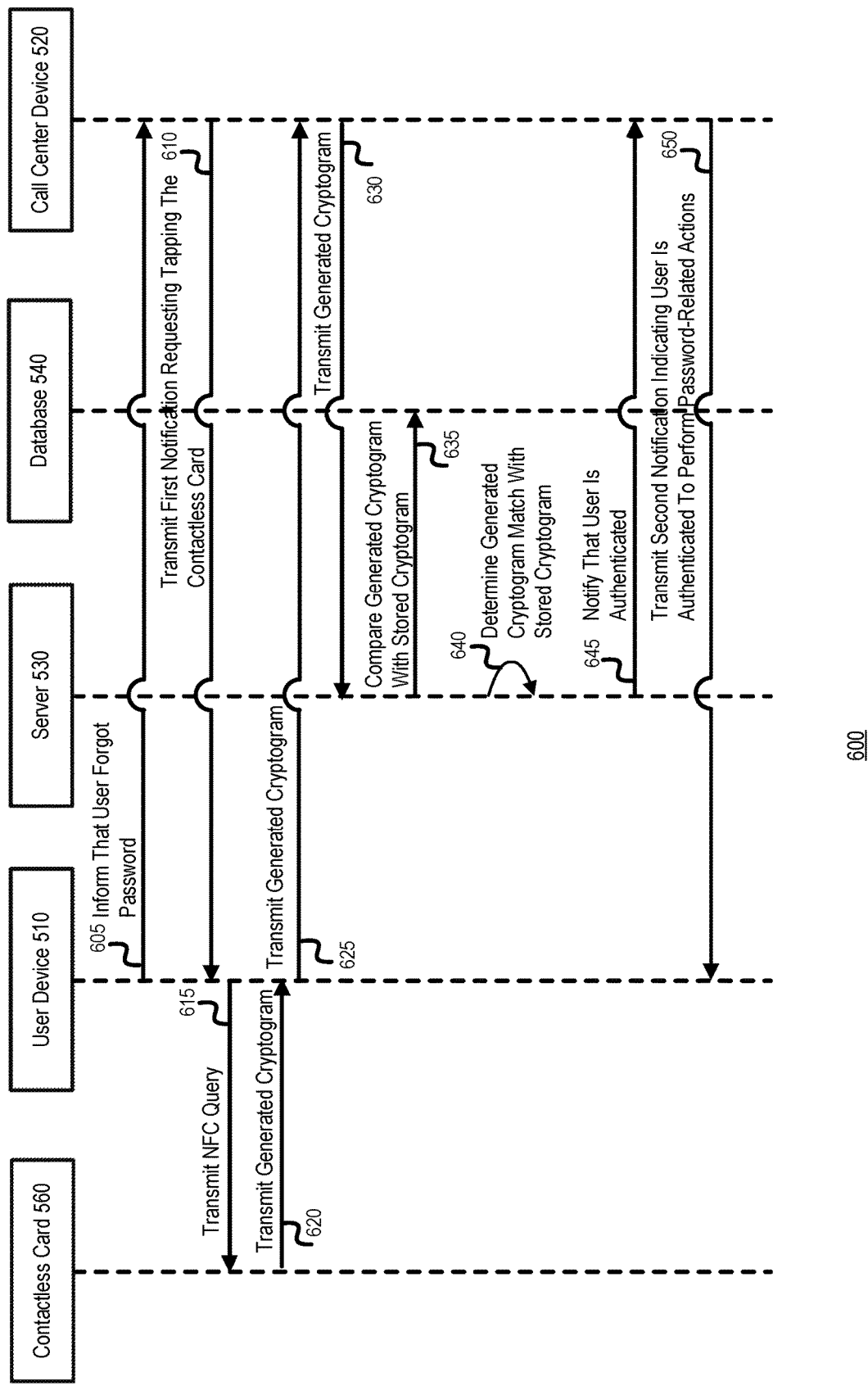
FIG. 6 is a sequence diagram of interactions between components of the system in FIG. 5 according to an example embodiment.

FIG. 6 illustrates an example sequence diagram 600 of interaction between the components of the system 500 according to an example embodiment. FIG. 6 may reference the same or similar components as those illustrated in FIG. 5, including a user device, a call center device, a server, a database, and a contactless card.

When a user forgets his/her password for an online account, for example, a financial account in a bank, the user may use the user device 510 to reach out to the call center device 520 indicating the user forgets his/her password of an online account at step 605. For example, the user may call the call center device 520.

At step 610, upon receiving the phone call from the user device 510, the call center device 520 may transmit a first authentication/notification request to the user device 510 asking the user to tap the contactless card 560 to the user device 510. The contactless card 560 can be used as an authentication factor for authenticating the user.

The first notification request can be a short message service (SMS) message with a link that would open up a mobile application or mobile application process on the user device 510 from which the contactless card 560 can be read in that mobile application.

Upon receiving the first notification request and by clicking on the link included in the request, the user may use the user device 510 to transmit an NFC prompt/query to the contactless card 560 at step 615. The user device 510 may include an NFC interface configured for establishing an NFC communication with other NFC-equipped devices (the contactless card 560 in this embodiment). In some of these embodiments, the NFC interface of the user device 510 may be or include an NFC receiver configured for selectively activating a magnetic field for use in establishing near field communication with an NFC transmitter. The NFC interface of the user device 510 is configured for establishing NFC communication when a passive NFC tag or other NFC-enabled device is brought into the magnetic field and within the NFC communication range of the user device 510. The NFC interface of the user device 510 is configured, in particular, for communication with the contactless card 560 when the card 560 is brought within communication range of the user device 510 (such as, the contactless card 560 is tapped by the user to the user device 510). As used herein, a tap of the contactless card 560 to the user device 510 may not indicate that the contactless card 560 is in a physical contact with the user device 510. A tap of the contactless card 560 to the user device 510 may refer to entry of the contactless card 560 into the NFC communication field of the user device 510.

In response, after entry of the contactless card 560 into the NFC communication field of the user device 510, the contactless card 560 transmits, at step 620 to the user device 510 NFC response information (e.g., a cryptogram) usable by the server 530 to authenticate the user. The NFC response information may be or include, for example, security information encrypted by the contactless card 560 using a private key unique to the card that is known only to the card account administrator (e.g., the server 530). The cryptogram may be stored in the memory of the contactless card 560. The cryptogram includes the unique identifier of the contactless card 560. The cryptogram is generated by the contactless card, which is referred to as a generated cryptogram herein.

At step 625, the user device 510 transmit the generated cryptogram to the call center device 520. At step 630, the call center device 520 transmits the NFC response information (the generated cryptogram) to the server 530. At step 635, the server 530 receives the generated cryptogram of the contactless card from the call center device 520 and may compare the generated cryptogram with a stored cryptogram that is stored in a database (e.g., the database 540). The stored cryptogram can be generated by the server as follows: the server generates card two UDK keys (one for encryption and one for authentication) using the pUID and two bin level master keys (one for encryption and one for authentication), the server generates two session keys (one for encryption and one for authentication) from the two UDK keys and the counter, and the server generates the stored cryptogram using the authentication session key.

At step 640, the server 530 determines that the generated cryptogram matches the stored cryptogram. For example, the server 530 decrypts the MAC message from the generated cryptogram using the encryption session key and validate the MAC over the same info (e.g., pUID, counter, shared secret) using the authentication (MAC) session key. Alternatively, the server 530 may validate the generated cryptogram by decrypting the generated cryptogram and extracting the unique identifier of the contactless card through the card authentication module of the server 530. When the server 530 receives the generated cryptogram, the server 530 may decrypt the generated cryptogram after verifying the generated cryptogram. The server 530 may then extract the unique identifier of the contactless card 560 which is uniquely associated with the user. The server 530 may verify the unique identifier of the contactless card 560 by searching the database 540 to compare the generated cryptogram with the stored cryptogram in the database 540. Then the server 530 may authenticate the user based on the unique identifier of the contactless card 560, for example, by determining that the generated cryptogram matches with the stored cryptogram. That is, the server 530 may authenticate the user using the contactless card 560 as the authentication factor based on the unique identifier of the contactless card 560.

In some embodiments, the server 530 may also require the user to enter a personal identification code/number (PIN) as a second authentication factor. Alternatively, the server 530 may require the user to enter a one-time passcode (OTP) as a third authentication factor that is randomly generated and transmitted by the server 530 to the user device 510 in a text message.

At step 645, the server 530 may transmit to the call center device 520 a message notifying the user has been authenticated. At step 650, the call center device 520 can transmit to the user device 510 a second notification indicating that the authentication result of using the contactless card 560 as the authentication factor is determined, that is, the user is authenticated to perform actions related to forgotten password. Once the user is authenticated by the server 530 using the contactless card 560 as the authentication factor, the user can perform the password-related actions through the user device. Herein, the password-related actions may include, but not limited to, resetting the password, changing the password, retrieving the password, receiving a temporary password from the server, using the temporary password for logging into the online account, and so forth.

The second notification may comprise a clickable link from which the user is able to reset, change, or retrieve the password of the online account. The second notification may be transmitted through an application programming interface (API) of the call center device 520. The second notification may comprise at least one selected from the group of a short message service (SMS) message with a deeplink, a mobile application notification, a push notification, or an email. The password-related actions may also include at least one selected from the group of using a temporary password to log into the online account and resetting the password of the online account.

As described above, when a user uses a user device to initiate an event or transaction with another device (e.g., the call center device 520), the user can be directed to use a mobile application installed on the user device to read a contactless card for authenticating the user as an authentication factor, for example, for multiple factor authentication. For example, the user may make a call to a call center associated with the call center device because the user is having a problem with his/her account, such as forgotten passwords, to verify the user, an SMS with a link that would open up a mobile application or mobile application process can be transmitted to the user through the user device and the user would be able to read the contactless card in that mobile application and then that contactless card data would go back to the call center device, so the call center would be able to verify the user through the server using the contactless card.

Figure 7:
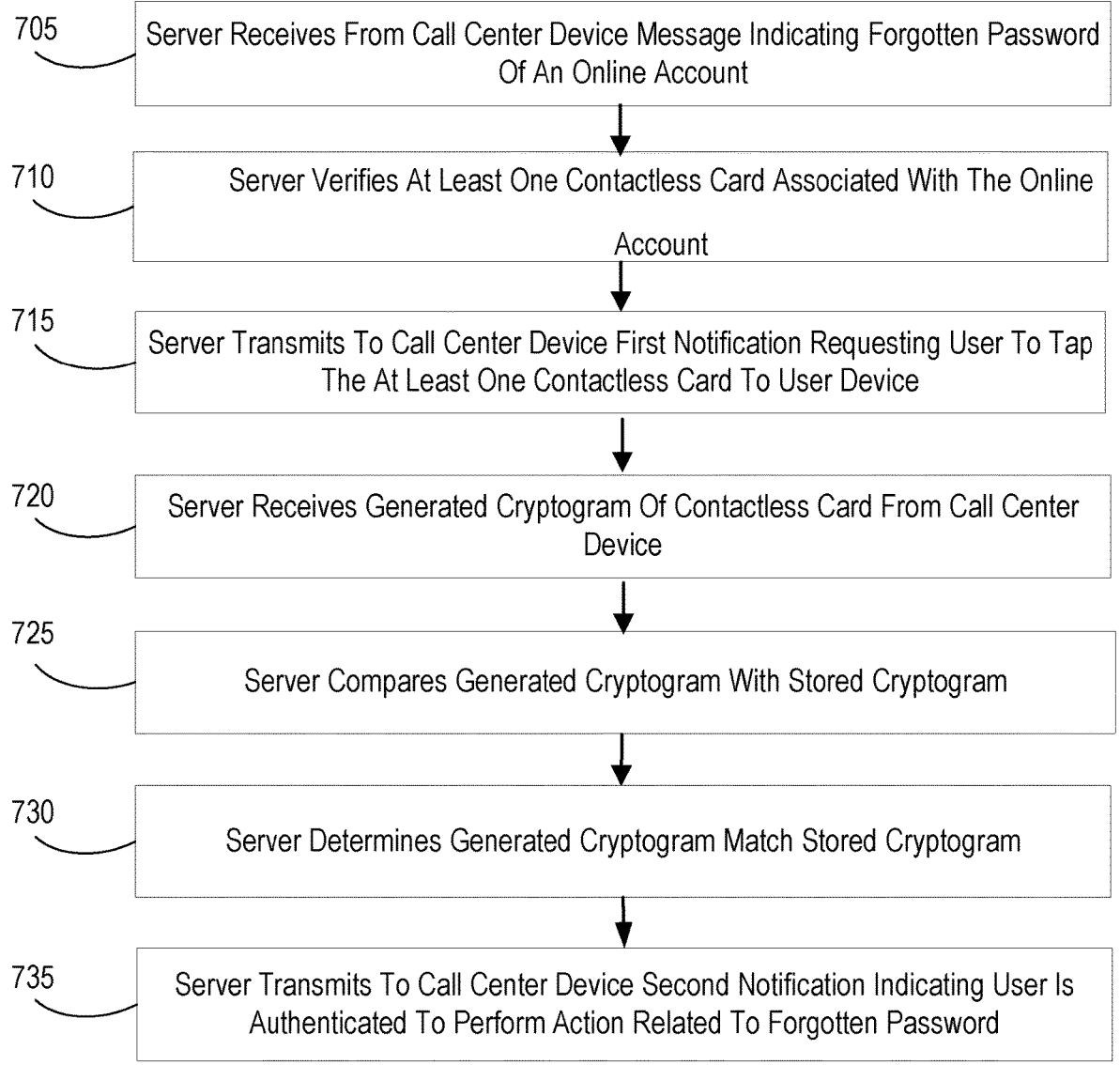
FIG. 7 is a flow chart of a method for managing passwords using a contactless card according to an example embodiment.

FIG. 7 illustrates a flow chart of an example method 700 for managing passwords using a contactless card as an authentication factor according to an example embodiment. FIG. 7 may reference the same or similar components as those illustrated in FIG. 5, including a user device, a call center device, a server, a database, and a contactless card. The method 700 can be implemented in the system 500 and may include, but is not limited to the following steps.

When a user forgets his/her password for an online account, such as a financial account or a merchant shopping account, the user may call using a user device to a customer service center that is associated with a call center device. In those example embodiments, the user using the user device initiates an engagement (makes a phone call) with the call center device. Upon receiving the phone call from the user device, the call center device may transmit a message to a server indicating the user forgets his/her password of an online account. Accordingly, at step 705, the server receives from the call center device the message indicating forgotten password of the online account.

Upon receiving the message from the call center device, at step 710, the server may search, for example using a phone number associated with the user device, a database (e.g., the database 540) to verify that at least one contactless card (e.g., the contactless card 560) is associated with the online account of the user.

To authenticate the user, at step 715, the server may transmit a message to the call center device requesting the user to tap the at least one contactless card to the user device. The at least one contactless card can be used as an authentication factor for authenticating the user. The call center device can then transmit a first notification request to the user device asking the user to tap the at least one contactless card to the user device. The first notification can be a short message service (SMS) message with a link that would open up a mobile application or mobile application process on the user device from which the contactless card can be read in that mobile application.

Upon receiving the first notification request and by clicking on the link included in the request, the user may use the user device to transmit an NFC prompt/query to the contactless card. The user device may include an NFC interface configured for establishing an NFC communication with other NFC-equipped devices (the contactless card 560 in this embodiment). In some of these embodiments, the NFC interface of the user device may be or include an NFC receiver configured for selectively activating a magnetic field for use in establishing near field communication with an NFC transmitter. The NFC interface of the user device is configured for establishing NFC communication when a passive NFC tag or other NFC-enabled device is brought into the magnetic field and within the NFC communication range of the user device. The NFC interface of the user device is configured, in particular, for communication with the NFC-enabled card when the card is brought within communication range of the user device (such as, the contactless card 560 is tapped by the user to the user device 510). As used herein, a tap of the contactless card to the user device may not indicate that the contactless card is in a physical contact with the user device. A tap of the contactless card to the user device may refer to entry of the contactless card into the NFC communication field of the user device.

In response, after entry of the contactless card into the NFC communication field of the user device, the contactless card transmits to the user device NFC response information (e.g., a cryptogram) usable by the server to authenticate the user. The NFC response information may be or include, for example, security information encrypted by the contactless card using a private key unique to the card that is known only to the card account administrator (e.g., the server 530). The cryptogram may be stored in the memory of the contactless card. The cryptogram includes the unique identifier of the contactless card. The cryptogram is generated by the contactless card, which is referred to as a generated cryptogram herein.

The user device transmits the generated cryptogram to the call center device. The call center device transmits the NFC response information (the generated cryptogram) to the server. Accordingly, at step 720, the server receives the generated cryptogram of the contactless card from the call center device and at step 725 may compare the generated cryptogram with a stored cryptogram that is stored in a database (e.g., the database 540). The stored cryptogram can be generated by the server as follows: the server generates card two UDK keys (one for encryption and one for authentication) using the pUID and two bin level master keys (one for encryption and one for authentication), the server generates two session keys (one for encryption and one for authentication) from the two UDK keys and the counter, and the server generates the stored cryptogram using the authentication session key.

At step 730, the server determines that the generated cryptogram matches the stored cryptogram. For example, the server decrypts the MAC message from the generated cryptogram using the encryption session key and validate the MAC over the same info (e.g., pUID, counter, shared secret) using the authentication (MAC) session key. Alternatively, the server may validate the generated cryptogram by decrypting the generated cryptogram and extracting the unique identifier of the contactless card through the card authentication module of the server. When the server receives the generated cryptogram, the server may decrypt the generated cryptogram. The server may then extract the unique identifier of the contactless card which is uniquely associated with the user. The server may verify the unique identifier of the contactless card by searching the database to compare the generated cryptogram with the stored cryptogram in the database. Then the server may authenticate the user based on the unique identifier of the contactless card, for example, by determining that the generated cryptogram matches with the stored cryptogram. That is, the server 530 may authenticate the user using the contactless card as the authentication factor based on the unique identifier of the contactless card.

In some embodiments, the server may also require the user to enter a personal identification code/number (PIN) as a second authentication factor. Alternatively, the server 530 may require the user to enter a one-time passcode (OTP) as a third authentication factor that is randomly generated and transmitted by the server to the user device in a text message.

At step 735, the server may transmit to the call center device a second notification notifying the user has been authenticated to perform actions related to forgotten password. The call center device can transmit to the user device a message indicating that the authentication result of using the contactless card as the authentication factor is determined, that is, the user is authenticated to perform actions related to forgotten password. Once the user is authenticated by the server using the contactless card as the authentication factor, the user can perform the password-related actions through the user device. Herein, the password-related actions may include, but not limited to, resetting the password, changing the password, retrieving the password, receiving a temporary password from the server, using the temporary password for logging into the online account, and so forth.

The message to the user device may comprise a clickable link from which the user is able to reset, change, or retrieve the password of the online account. The message may be transmitted through an application programming interface (API) of the call center device. The message may comprise at least one selected from the group of a short message service (SMS) message with a deeplink, a mobile application notification, a push notification, or an email. The password-related actions may also include at least one selected from the group of using a temporary password to log into the online account and resetting the password of the online account.

In some embodiments, the user device may receive from the call center device or the server a push notification of using the contactless card as the authentication factor. The user may tap the push notification and hold his/her finger down for a relatively long duration, which opens up an immediate capability for the user to tap the contactless card quicker. This can remove another step the user has to perform and reduce friction and time to allow the user to take action more quickly.

In some embodiments, the user may be required to log in the mobile application installed on the user device for reading the contactless card, such as face ID. In some other embodiments, the user may not be required to log in the mobile application installed on the user device for reading the contactless card.

In some embodiments, the phone call may occur between the user device and an interactive voice response (IVR) device and/or system. For example, the user may use the user device to call in to the IVR system, punches selections and input initial information that is required to identify who they are by following the prompts. Then the user can trigger, based on the task or the action (e.g., change and/or reset forgotten password) they want to take on the IVR system, a push notification to go to the user device, and that push notification would open up a contactless card tap for the authentication factor. The systems and methods disclosed herein can use the authentication factor to allow the user to perform a more risky transaction (e.g., reset forgotten password). This can open up an avenue that instead of needing to go to a physical agent, the user can perform within that task or action within the IVR experience.

As described, the present disclosure provides a method for password management using a contactless card. The method can comprise: receiving, by a server from a user device of a user, a message indicating a forgotten password of an online account of the user; verifying, by the server, at least one contactless card associated with the online account; transmitting, by the server to the user device, a first notification requesting the user to tap the at least one contactless card to the user device; receiving, by the server from the user device, a generated cryptogram, wherein the generated cryptogram is generated by the at least one contactless card; comparing, by the server, the generated cryptogram with a stored cryptogram associated with the at least one contactless card; and in response to a determination that the generated cryptogram matches the stored cryptogram, transmitting, by the server to the user device, a second notification indicating the user is authenticated to perform an action related to the forgotten password. The user device can be a near field communication (NFC) enabled device. The stored cryptogram can be stored in a database in data communication with the server. The generated cryptogram can be generated by the at least one contactless card based on a unique identifier of the at least one contactless card. The method can further comprise: decrypting, by the server, the generated cryptogram; extracting, by the server, from the decrypted generated cryptogram a unique customer identifier associated with the at least one contactless card; verifying, by the server, the unique customer identifier; and authenticating, by the server, the user using the unique customer identifier. The at least one contactless card can comprise a processor and a memory, the memory storing an applet for generating the generated cryptogram that contains the unique customer identifier of the at least one contactless card. The memory of the at least one contactless card can further contain a counter value and a key, and the processor of the at least one contactless card can be configured to execute the applet to generate the generated cryptogram using the counter value, the key, and the unique customer identifier. The processor of the at least one contactless card can be configured to execute the applet to update the counter value. The second notification can comprise at least one selected from the group of a short message service (SMS) message with a deeplink, a mobile application notification, a push notification, or an email. The action related to the forgotten password, can comprise at least one selected from the group of using a temporary password to log into the online account and resetting the password of the online account.

The present disclosure also provides a system for password management using a contactless card. The system can comprise a server. The server can be configured to: receive, from a user device of the user, a message indicating a forgotten password of an online account of the user; verify at least one contactless card is associated with the online account; transmit, to the user device, a first notification requesting the user to tap the at least one contactless card to the user device; receive, from the user device, a generated cryptogram wherein the generated cryptogram is generated by the at least one contactless card; compare the generated cryptogram with a stored cryptogram associated with the at least one contactless card; and in response to a determination that the generated cryptogram matches the stored cryptogram, transmit, to the user device, a second notification indicating the user is authenticated to perform an action related to the forgotten password. The user device can be at least one selected from the group of a mobile phone, a laptop computer, a tablet computer, and a desktop computer. The at least one contactless card can be at least one selected from the group of a credit card, a debit card, and a gift card. The server can be further configured to: receive a card verification code (CVC) of the at least one contactless card, and authenticate the user based on the CVC. The second notification can comprise a temporary password for the online account. The generated cryptogram can be generated by the at least one contactless card based on a counter value contained in the at least one contactless card. The second notification can comprise a clickable link from which the user is able to reset the password of the online account. The server can be further configured to verify a counter value of the at least one contactless card. The second notification can be transmitted through an application programming interface (API).

The present disclosure provides a non-transitory, computer readable medium. The non-transitory, computer readable medium comprises instructions for password management using a contactless card that, when executed on a computer arrangement, perform actions comprising: receiving, from a user device of the user, a message indicating a forgotten password of an online account of the user; verifying at least one contactless card is associated with the online account; transmitting, to the user device, a first notification requesting the user to tap the at least one contactless card to the user device; receiving, from the user device, a generated cryptogram, wherein the generated cryptogram is generated by the at least one contactless card; comparing the generated cryptogram with a stored cryptogram associated with the at least one contactless card; and in response to a determination that the generated cryptogram matches the stored cryptogram, transmitting, to the user device, a second notification indicating the user is authenticated to perform an action related to the forgotten password.

As used herein, the term "contactless card" is not limited to a particular type of card. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

As used herein, the terms "account" or "online account" are not limited to a particular type of account. Rather, the terms "account" or "online account" can refer to accounts having any purpose including, without limitation, a credit account, a debit account, a membership account, a loyalty account, a rewards account, a savings account, a checking account, a brokerage account, a retirement account, a service account, a subscription account, a utilities account, and a government account.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of a contactless card, a user device, a call center device, a server, a database, and/or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for password management using a contactless card, comprising:
receiving, by a server from a user device of a user, a message indicating a forgotten password of an online account of the user;
verifying, by the server, at least one contactless card associated with the online account;
transmitting, by the server to the user device, a first notification requesting the user to tap the at least one contactless card to the user device;
receiving, by the server from the user device, a generated cryptogram, wherein the generated cryptogram is generated by the at least one contactless card;
comparing, by the server, the generated cryptogram with a stored cryptogram associated with the at least one contactless card; and
in response to a determination that the generated cryptogram matches the stored cryptogram:
generating, by the server, a secure communications channel with the user device, wherein the secure communications channel utilizes a private communication network for secure communications; and
transmitting, by the server to the user device over the secure communications channel, a second notification including a clickable link to perform an action related to the forgotten password, wherein the second notification is transmitted over the secure communications channel using an encrypted communications protocol or a browser-based communication protocol.

2. The method according to claim 1, wherein: the user device is a near field communication (NFC) enabled device, the private communication network includes one or more of a closed network, a virtual private network, or an offline private network, and
the encrypted communications protocol includes one or more of a hypertext transfer protocol (HTTP) secure socket layer (SSL) communication protocol or an HTTP secure (HTTPS) communication protocol.

3. The method according to claim 1, wherein: the stored cryptogram is stored in a database in data communication with the server, and
the second notification is transmitted through an application programming interface (API) of the server.

4. The method according to claim 1, wherein the generated cryptogram is generated by the at least one contactless card based on a unique identifier of the at least one contactless card.

5. The method according to claim 1, further comprising:
decrypting, by the server, the generated cryptogram;
extracting, by the server, from the decrypted generated cryptogram a unique customer identifier associated with the at least one contactless card;
verifying, by the server, the unique customer identifier; and
authenticating, by the server, the user using the unique customer identifier.

6. The method according to claim 1, wherein the at least one contactless card comprises a processor and a memory, the memory storing an applet for generating the generated cryptogram that contains an unique customer identifier of the at least one contactless card.

7. The method according to claim 6, wherein:
the memory of the at least one contactless card further contains a counter value and a key, and
the processor of the at least one contactless card is configured to execute the applet to generate the generated cryptogram using the counter value, the key, and the unique customer identifier.

8. The method according to claim 7, wherein the processor of the at least one contactless card is configured to execute the applet to update the counter value.

9. The method according to claim 1, wherein the second notification comprises at least one selected from a group consisting of a short message service (SMS) message with a deeplink, a mobile application notification, a push notification, or an email.

10. The method according to claim 1, wherein the action related to the forgotten password, comprises at least one selected from the group of using a temporary password to log into the online account and resetting the password of the online account.

11. A system for password management using a contactless card, comprising a server, the server configured to:
receive, from a user device of a user, a message indicating a forgotten password of an online account of the user;
verify at least one contactless card is associated with the online account;
transmit, to the user device, a first notification requesting the user to tap the at least one contactless card to the user device;
receive, from the user device, a generated cryptogram wherein the generated cryptogram is generated by the at least one contactless card;
compare the generated cryptogram with a stored cryptogram associated with the at least one contactless card; and
in response to a determination that the generated cryptogram matches the stored cryptogram:

generate, by the server, a secure communications channel with the user device, wherein the secure communications channel uses a private communication network for secure communications; and transmit, to the user device over the secure communications channel, a second notification including a clickable link to perform an action related to the forgotten password, wherein the second notification is transmitted over the secure communications channel using an encrypted communications protocol or a browser-based communication protocol.

12. The system according to claim 11, wherein: the user device is at least one selected from a group consisting of a mobile phone, a laptop computer, a tablet computer, and a desktop computer, the private communication network includes one or more of a closed network, a virtual private network, or an offline private network, and the encrypted communications protocol includes one or more of a hypertext transfer protocol (HTTP) secure socket layer (SSL) communication protocol or an HTTP secure (HTTPS) communication protocol.

13. The system according to claim 11, wherein the at least one contactless card is at least one selected from a group consisting of a credit card, a debit card, and a gift card.

14. The system according to claim 11, wherein the server is further configured to:

receive a card verification code (CVC) of the at least one contactless card, and authenticate the user based on the CVC.

15. The system according to claim 11, wherein the second notification comprises a temporary password for the online account.

16. The system according to claim 11, wherein the generated cryptogram is generated by the at least one contactless card based on a counter value contained in the at least one contactless card.

17. The system according to claim 11, wherein the second notification comprises a clickable link from which the user is able to reset the password of the online account.

18. The system according to claim 11, wherein the server is further configured to verify a counter value of the at least one contactless card.

19. The system according to claim 11, wherein the second notification is transmitted through an application programming interface (API) of the system.

20. A non-transitory, computer-readable medium comprising instructions for password management using a contactless card that, when executed on a computer arrangement, perform operations comprising:

receiving, from a user device of a user, a message indicating a forgotten password of an online account of the user;

verifying at least one contactless card is associated with the online account;

transmitting, to the user device, a first notification requesting the user to tap the at least one contactless card to the user device;

receiving, from the user device, a generated cryptogram, wherein the generated cryptogram is generated by the at least one contactless card;

comparing the generated cryptogram with a stored cryptogram associated with the at least one contactless card; and in response to a determination that the generated cryptogram matches the stored cryptogram:

generating a secure communications channel with the user device, wherein the secure communications channel uses a private communication network for secure communications; and transmitting, to the user device over the secure communications channel, a second notification including a clickable link to perform an action related to the forgotten password, wherein the second notification is transmitted over the secure communications channel using an encrypted communications protocol or a browser-based communication protocol.

\* \* \* \* \*